United States Patent [19]
Yamazaki et al.

[11] Patent Number: 6,071,606
[45] Date of Patent: Jun. 6, 2000

[54] HYDROPHILIC FILM AND METHOD FOR FORMING SAME ON SUBSTRATE

[75] Inventors: Seiji Yamazaki; Kensuke Makita, both of Mie; Yasuaki Kai, Yokohama; Satoko Sugawara; Takashi Seino, both of Yokosuka, all of Japan

[73] Assignees: Nissan Motor Co., Ltd, Yokohama; Central Glass Company, Limited, Ube, both of Japan

[21] Appl. No.: 08/917,617

[22] Filed: Aug. 26, 1997

[30] Foreign Application Priority Data

Aug. 26, 1996 [JP] Japan .................................. 8-223649
Aug. 26, 1996 [JP] Japan .................................. 8-241018

[51] Int. Cl.$^7$ ...................................... B32B 17/00
[52] U.S. Cl. ........................... 428/325; 428/428; 428/432
[58] Field of Search .................... 428/325, 428, 428/432

[56] References Cited

U.S. PATENT DOCUMENTS

| | | | |
|---|---|---|---|
| 3,833,399 | 9/1974 | Martyn et al. | 117/33.5 |
| 4,214,908 | 7/1980 | Deguchi et al. | 106/13 |
| 4,232,062 | 11/1980 | Okino et al. | 427/160 |
| 4,694,218 | 9/1987 | Chao | 313/478 |
| 5,348,805 | 9/1994 | Zagdoun et al. | 428/432 |

FOREIGN PATENT DOCUMENTS

| | | |
|---|---|---|
| 0 183 770 B1 | 6/1986 | European Pat. Off. . |
| 0 374 754 | 6/1990 | European Pat. Off. . |
| 0 433 915 | 6/1991 | European Pat. Off. . |
| 0 748 775 | 12/1996 | European Pat. Off. . |
| 29 10262 C2 | 3/1978 | Germany . |
| 40 35 218 A1 | 11/1989 | Germany . |
| 690 17 860 T2 | 12/1989 | Germany . |
| 52-101680 | 8/1977 | Japan . |
| 53-58492 | 5/1978 | Japan . |
| 54-105120 | 8/1979 | Japan . |
| 55-154351 | 12/1980 | Japan . |
| 2 015 989 | 9/1979 | United Kingdom . |
| 2 257 439 | 1/1993 | United Kingdom . |
| 2 271 782 | 4/1994 | United Kingdom . |
| 85/05292 | 12/1985 | WIPO . |
| 96/29375 | 9/1996 | WIPO . |
| 97/07069 | 2/1997 | WIPO . |

*Primary Examiner*—Timothy M. Speer

[57] ABSTRACT

The invention relates to a hydrophilic film formed on a substrate. This film has a hydrophilic outermost layer having a matrix phase containing titania and a disperse phase constituted of at least one compound of silica and alumina. The matrix phase may further contain an amorphous metal oxide. With this, the outermost layer becomes superior in abrasion resistance. The at least one compound of the disperse phase may be a non-spherical colloidal silica. With this, the outermost layer becomes substantially improved in scratch resistance. The outermost layer is formed on the substrate by a method including sequential steps of (a) providing a sol mixture including a first sol containing a precursor of the titania and a second sol containing the at least one compound; (b) coating the substrate with the sol mixture, thereby to form thereon a precursory film; and (c) baking the precursory film into the outermost layer.

19 Claims, 1 Drawing Sheet

×50,000

×50,000

×50,000

6,071,606

HYDROPHILIC FILM AND METHOD FOR FORMING SAME ON SUBSTRATE

The contents of Japanese Patent Application Nos. 8-223649 and 8-241018, each having a filing date of Aug. 26, 1996, are hereby incorporated by reference.

BACKGROUND OF THE INVENTION

The present invention relates to hydrophilic films and methods for forming such film on the surface of a substrate made of material such as glass, metal, plastic, or the like.

Hitherto, for example, inorganic plate glass has been widely used for various articles such as window pane, mirror and eyeglass lenses, by the reason of its transparency and other good characteristics. When such article is used, for example, in a place of high temperature and high humidity, the dew condensation is caused on its surface, thereby to fog the same. In addition to this fogging problem, there has been another problem, for example, in the automotive outside mirror, to have many raindrops on its surface in the rainy weather. These problems interfere with the automotive rear view of the driver. Thus, there have been various proposals to provide the above-mentioned articles with antifogging property, water-drops preventive property, and durability. For example, there has been a proposal to form a hydrophilic film on the surface of a substrate such as glass plate, for the purpose of preventing fogging and the water-drops attachment thereto. There has been known for a long time a proposal of applying a surface active agent to the surface of such substrate, for achieving this purpose. For example, Japanese Patent Unexamined Publication JP-A-52-101680 discloses an antifogging agent for transparent article such as glass. This agent contains polyacrylic acid, a surface active agent, and a solvent which is water and/or alcohol. JP-A-55-154351 discloses a hydrophilic film formed on substrate. This film contains a phosphorus oxide and at least one of a molybdenum oxide and a tungsten oxide. JP-A-54-105120 discloses a method for producing an antifogging glass article by contacting an inorganic glass substrate containing $P_2O_5$, with a $P_2O_5$-containing liquid or apor. Furthermore, JP-A-53-58492 discloses an antifogging agent containing at least one sulfonic-acid-type amphoteric surface active agent represented by a general formula disclosed therein, and at least one particular inorganic salt or acetate represented by a general formula disclosed therein. International Laid-open Publication WO96/29375 discloses a method of photocatalytically making the surface of a base material ultrahydrophilic. This method comprises the step of coating the surface with a layer containing photocatalytic semiconductor material such as titania and the step of photoexciting the photocatalytic material. In this publication, there is disclosed a photocatalytic coating formed on a substrate. This coating, which is superior in abrasion resistance, is composed of a mixture of titania and silica. There is further disclosed in this publication that such coating is formed on a substrate at first by preparing a sol mixture of an anatase-type titania sol and a colloidal silica sol, then by spraying the sol mixture onto the substrate, and then by baking the coated substrate. There is a demand for a hydrophilic film which has a long time duration in hydrophilicity.

SUMMARY OF THE INVENTION

It is therefore an object of the present invention to provide a hydrophilic film formed on a substrate, which film has a long time duration in hydrophilicity.

It is another object of the present invention to provide such film which is also superior in abrasion resistance or scratch resistance.

It is still another object of the present invention to provide a hydrophilic article having such hydrophilic film formed on a substrate.

According to the present invention, there is provided a hydrophilic film formed on a substrate. This film has a hydrophilic outermost layer comprising titania and at least one compound which is in the form of fine particles and is selected from the group consisting of silica and alumina. According to the present invention, there is further provided a hydrophilic article comprising a substrate and the above-mentioned hydrophilic film formed thereon. According to the present invention, there is still further provided a method for producing such hydrophilic article. This method comprises sequential steps of:

(a) providing a sol mixture including a first sol containing a precursor of the titania and a second sol containing the at least one compound dispersed therein;

(b) coating the substrate with the sol mixture, thereby to form thereon a precursory film; and (c) baking the precursory film into the outermost layer.

According to the present invention, the hydrophilic film has a long time duration in hydrophilicity, due to the inclusion of the above-mentioned at least one compound (i.e., silica and/or alumina) in the outermost layer.

According to the present invention, the hydrophilic outermost layer may further comprise an amorphous metal oxide (e.g., silica, alumina, zirconia and mixtures of at least two of these). With this, the outermost layer may be improved in continuity. In other words, it is assumed that void spaces of titania grain boundaries are occupied by or filled with the amorphous metal oxide. With this, it is assumed that the outermost layer becomes continuous in structure, and thus is substantially improved in abrasion resistance. It should be noted that the amorphous metal oxide is different from the at least one compound. In fact, the particle diameter of the amorphous metal oxide is far smaller than that of the at least one compound. Furthermore, a combination of the titania and the amorphous metal oxide constitute the outermost layer's matrix phase (continuous phase). In contrast, the at least one compound, which is in the form of fine particles, constitutes the disperse phase distributed over the matrix phase.

According to the present invention, the above-mentioned at least one compound may be a colloidal silica which is in a non-spherical form. Due to the use of this colloidal silica, the outermost layer is substantially improved in scratch resistance.

DESCRIPTION OF THE PREFERRED EMBODIMENTS

As stated above, the hydrophilic film formed on a substrate has the above-mentioned outermost layer. As will be clarified hereinafter, the hydrophilic film may be composed of only the outermost layer or may have a metal oxide interlayer interposed between the substrate and the outermost layer. This outermost layer is hydrophilic, due to the inclusion of titania therein. Furthermore, when the exposed surface of the outermost layer is stained with contaminants such as dust, these contaminants are decomposed and thus removed therefrom by the photocatalytic oxidative activity of titania therein. This titania may be in the amorphous form or in the anatase-type or rutile-type crystal form. Of these, the anatase-type titania is particularly preferable, because it is the highest in the photocatalytic activity.

In the invention, the material used for the substrate is not particularly limited, and can be selected from various conventional ones such as metal, glass, and inorganic and organic resins.

As stated above, the hydrophilic outermost layer may further comprise the amorphous metal oxide, in addition to the titania and the silica and/or alumina. When the outermost layer includes this amorphous metal oxide, the above-mentioned sol mixture used for preparing the outermost layer may contain a third sol containing a precursor of the amorphous metal oxide, in addition to the first and second sols. The third sol is a metal oxide sol such as silica sol, a silica-alumina (double oxide) sol, or a silica-zirconia (double oxide) sol.

The mechanism of the function of the amorphous metal oxide in the outermost layer can be speculated as follows. If the amorphous metal oxide is not included in the outermost layer, the outermost layer itself may become brittle, due to many void spaces in the boundaries between the titania crystal grains. Thus, when this outermost layer receives a stress, it may have a brittle fracture and thus may exfoliate from the substrate. In contrast, if the amorphous metal oxide is included in the outermost layer, it is assumed that the above void spaces are occupied by or filled with the amorphous metal oxide. That is, the amorphous metal oxide is assumed to serve as a binder for binding together the titania crystal grains. With this, the outermost layer is substantially improved in abrasion resistance. As stated above, the particle diameter of the amorphous metal oxide is far less than that of the silica and/or alumina and is difficult to be measured by general known methods.

Figure 1:
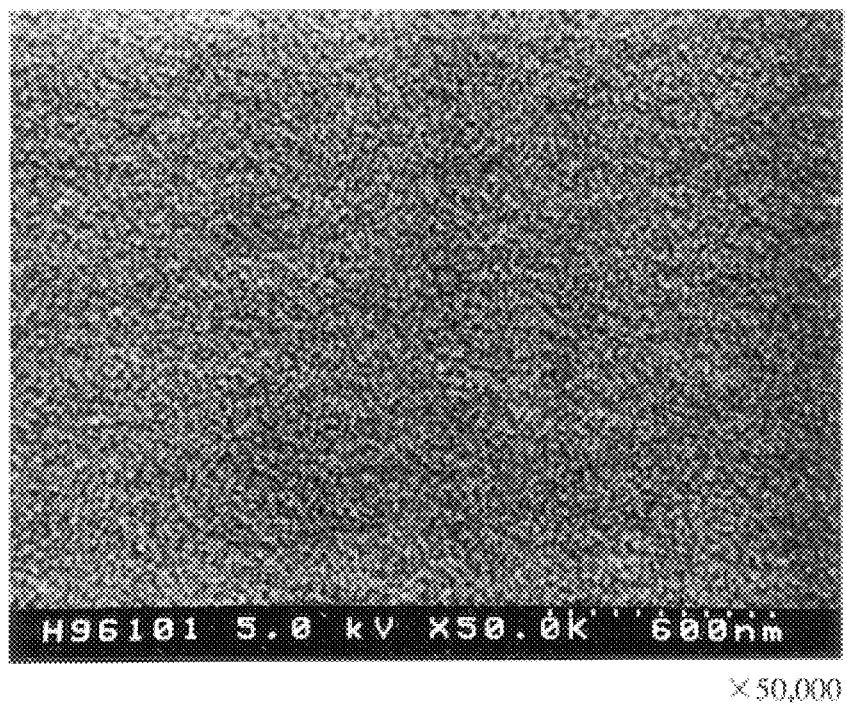
FIG. 1 is a photograph taken by scanning electron microscope, showing the surface of a film composed of only titania, which is not in accordance with the present invention.
Figure 2:
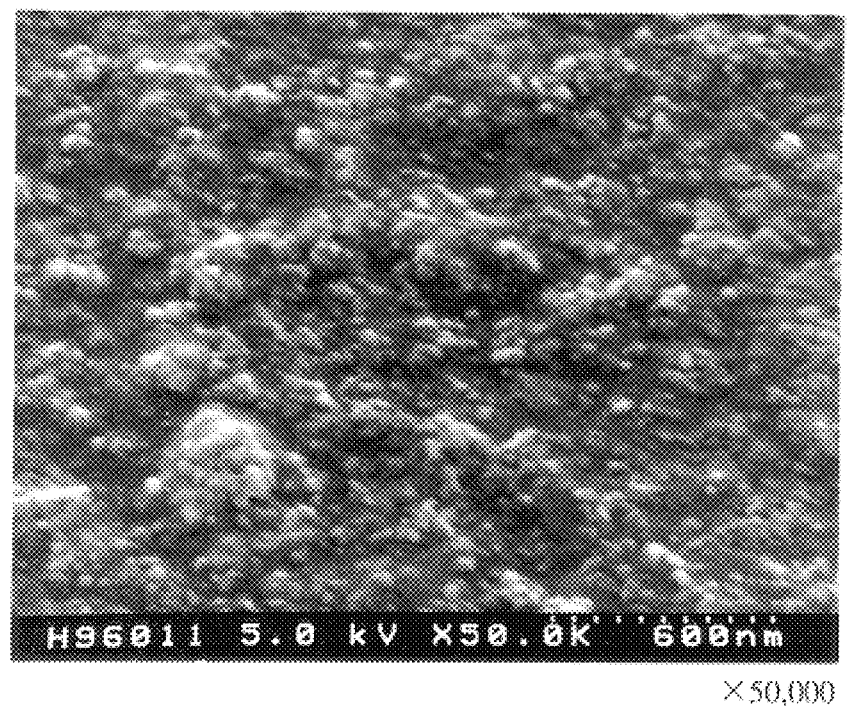
FIG. 2 is a photograph similar to FIG. 1, but showing the surface of a film composed of titania, amorphous silica and silica fine particles, which is in accordance with the present invention.

FIG. 1 is a photograph taken by scanning electron microscope, showing the surface of a film composed of only titania, which is not in accordance with the present invention. This film, formed on a glass substrate, has been prepared by a sol-gel process. In FIG. 1, a great number of fine particles of titania can be seen. FIG. 2 is a photograph similar to FIG. 1, but showing the surface of a film composed of titania, an amorphous silica and silica fine particles, which is in accordance with the present invention. In FIG. 2, there can be seen an amorphous silica continuous film between titania fine particles, and white aggregates of the silica fine particles. In other words, the outermost layer is composed of a matrix phase and a disperse phase distributed over the matrix phase. The matrix phase (continuous phase), which mainly forms the skeleton of the outermost layer, is constituted of a combination of the titania and the amorphous metal oxide, and the disperse phase is constituted of the silica and/or alumina fine particles, which may cohere into aggregates, as shown in FIG. 2. The silica and/or alumina fine particles make the surface of the outermost layer uneven and improve the outermost layer in water holding capacity.

In the invention, the sol mixture used for preparing the outermost layer may include silica sol as the third sol. In this case, it is generally assumed that Si—O—Ti bond is generated by the first sol (titania sol) and the third sol (silica sol), which turn into a gel through dehydropolycondensation (i.e., dehydration and polycondensation) of each of the first and third sols, and that this bond interferes with the crystallization of titania. However, the titania sol is far higher than the silica sol in the rate of dehydropolycondensation. Therefore, as long as the amount of the silica sol is up to the upper limit, the titania can crystallize and maintain the photocatalytic activity. In this connection, it is preferable that the amorphous metal oxide is in an amount of from 10 to 25 mol % and that the titania is in an amount of from 75 to 90 mol %, based on the total number of moles of the titania and the amorphous metal oxide. If it is less than 10 mol %, the outermost layer may become insufficient in abrasion resistance. Thus, it may exfoliate from the substrate in a traverse-type abrasion resistance test or another test. If it is greater than 25 mol %, the amount of titania may become too small to obtain a sufficient photocatalytic activity of titania.

When the surface of the hydrophilic outermost layer is stained with organic contaminants such as hydrocarbons, these contaminants are decomposed by the photocatalytic oxidative activity (photodecomposition property) of titania under a condition that the ultraviolet radiation intensity is relatively high. With this, the outermost layer is maintained in hydrophilicity. However, it becomes difficult to maintain hydrophilicity of the outermost layer, under a condition that the ultraviolet radiation intensity is not relatively high, for example, in the night or in the rainy weather. This problem can be solved by including in the outermost layer silica and/or alumina which is in the form of fine particles and has a large amount of physically adsorbed water. The silica and/or alumina fine particles have a particle diameter of preferably from 1 nm to 60 nm, more preferably from 8 to 12 nm. The silica and/or alumina is preferably in an amount of from 10–50 wt %, based on the total weight of the outermost layer. If it is less than 10 wt %, the outermost layer may become insufficient in hydrophilicity. If it is greater than 50 wt %, the photocatalytic activity of titania may become insufficient. With this, the outermost layer may become insufficient in abrasion resistance.

In the invention, a colloidal silica, which is in a spherical or non-spherical form, can be used as the above-mentioned silica and/or alumina. When a colloidal silica having a non-spherical form is used in the preparation of the outermost layer, the outermost layer becomes substantially improved in abrasion resistance. Furthermore, this colloidal silica can prevent the titania, which is, for example, in the anatase-type or rutile-type crystal, from lowering in crystallinity. In other words, this colloidal silica is made up of an elongate portion(s) having a diameter preferably of up to 50 nm and an axial length preferably of from 40 to 500 nm. If the axial length is less than 40 nm, the colloidal silica may have a nearly spherical form. With this, the outermost layer may not be substantially improved in abrasion resistance. If the diameter and the axial length of the colloidal silica respectively exceed 50 nm and 500 nm, the outermost layer may become hazy. Exemplary commercial products of the non-spherical colloidal silica are ST-UP and ST-OUP of Nissan Chemical Industries, Ltd. It is preferable that the non-spherical colloidal silica is in an amount of from 20 to 70 wt %, based on the total weight of the outermost layer. If it is less than 20 wt %, the outermost layer may not be substantially improved in hydrophilicity and hardness. If it is greater than 70 wt %, the titania content of the outermost layer may become too low to maintain the photocatalytic activity.

In the invention, it is preferable that the outermost layer has a thickness of from 20 to 500 nm. If it is less than 20 nm, the outermost layer may become insufficient in hydrophilicity. If it is greater than 500 nm, the outermost layer tends to have cracks thereon and thus may not become transparent.

In the invention, it is optional to add an additional metal oxide to the sol mixture, which is used for preparing the outermost layer. This additional metal oxide can be at least one selected from the group consisting of iron titanate, iron oxide, bismuth oxide, molybdenum oxide, nickel oxide, tungsten oxide, yttrium oxide, tin oxide, manganese oxide, zinc oxide, cobalt oxide, copper oxide, silver oxide, vanadium oxide, chromium oxide, and zirconium oxide.

In case that the substrate is made of soda-lime glass, it is preferable to interpose an intermediate layer (metal oxide layer) between the substrate and the outermost layer. The material used for the intermediate layer is not particularly limited, as long as there can be prevented the migration of sodium ion from the soda-lime glass into the outermost layer. This material is preferably silica, alumina, or a double oxide of silica and alumina. If sodium ion presents in the outermost layer, it reacts with titania, thereby to form $TiO_{2-x}Na_x$. This compound provides a site to reunite holes and electrons, which have been generated by ultraviolet rays. This reduces photocatalytic activity of titania.

It is preferable that the light source contains ultraviolet rays having wavelengths of up to 400 nm, in order to decompose contaminants disposed on the outermost layer, by the photocatalytic activity of titania. Examples of the light source usable in the invention are sunbeam, mercury lamp, fluorescent lamp, halogen lamp, xenon short-arc lamp, and laser beam. In the invention, it is not necessary to provide an artificial light source, but the natural light such as sunbeam will suffice. It is optional to provide an artificial light source in a manner that the outermost layer is directly exposed to the light rays from the light source.

In the above-mentioned method for producing the hydrophilic article, the step (c) of baking the precursory film into the outermost layer is conducted preferably at a temperature of from 300 to 850° C., more preferably from 400 to 850° C. If the baking temperature is lower than 300° C., the outermost layer may become insufficient in hardness and in abrasion resistance. If the baking temperature is higher than 850° C., the anatase-type titania may turn into the rutile-type titania. With this, the photocatalytic activity of titania may be substantially lowered.

In the invention, the third sol, which turns into the amorphous metal oxide, may be prepared from a metal alkoxide or metal acetylacetonate, such as silicon alkoxide. The first sol (titania sol) may be prepared through hydrolysis and subsequent dehydropolycondensation, for example, of a titanium alkoxide such as titanium tetraisopropoxide or tetraethoxy titanium. In the preparation of the first or third sol, it is optional to use a ligand to adjust the degree of hydrolysis and that of dehydropolycondensation.

In the invention, the titania precursor contained in the first sol and the amorphous metal oxide's precursor contained in the third sol respectively turn into the titania and the amorphous metal oxide, through their dehydropolycondensation, in the preparation of the outermost layer. In contrast, the second sol contains the at least one compound (i.e., silica and/or alumina fine particles) dispersed therein. This at least one compound is distributed over the matrix phase of the outermost layer, in the preparation of the outermost layer.

In the invention, it is optional to add an additive to the third sol. This additive is, for example, at least one selected from metal sulfates, metal nitrates, metal carbonates, metal acetates, metal stearate, metal halides (e.g., metal chlorides and metal iodides), and condensates of these.

In the invention, exemplary commercial product names of the silica sol used as the third sol are SUPER-CERA of Daihachi Kagaku Kogyosho Co., CERAMICA of Nichi-ita Kenkyusho Co., HAS of Col Coat Co., ATRON NSi-500 of Nippon Soda Co., Ltd., and CGS-DI-0600 of Chisso Co. Exemplary commercial product names of the titania sol (first sol) are TA-10 and TA-15 of Nissan Chemical Industries, Ltd., and ATRON Nti-500 of Nippon Soda Co., Ltd. Exemplary commercial product names of the zirconia sol used as the third sol are NZS-30A and NZS-30B of Nissan Chemical Industries, Ltd., and AZS-A, AZS-NB and AZS-B of Nihon Shokubai Kagaku Kogyo Co. Exemplary commercial product names of the alumina sol used as the third sol are ALUMINA SOL 100, ALUMINA SOL 200 and ALUMINA SOL 520 of Nissan Chemical Industries, Ltd., and CATAL-LOID AS-3 of Shokubai Kasei Kogyo Co.

In the invention, it is optional to dilute the sol mixture with water or with an organic solvent. This organic solvent is not particularly limited. Examples of the organic solvent are primary alcohols such as methanol, ethanol and propyl alcohol; secondary alcohols such as isopropyl alcohol; tertiary alcohols such as tertiary butanol; ketones such as acetone and methyl ethyl ketone; ethers; aliphatic, aromatic and alicyclic hydrocarbons such as benzene, toluene, xylene, chloroform, pentane, hexane and cyclohexane; and mixtures of at least two of these.

In the invention, the manner of applying the sol mixture to the substrate or to the intermediate layer is not particularly limited. It may be dip coating, spraying, flow coating, or spin coating.

The following nonlimitative examples are illustrative of the present invention.

EXAMPLE 1

In this example, the hydrophilic outermost layer was formed directly on a glass substrate, as follows.

At first, a quartz glass substrate having widths of 100 mm and a thickness of 1.9 mm was washed with neutral detergent, then water and then ethanol, and then was dried.

Separately, a 0.5 mol/L titanium alkoxide solution was prepared by dissolving titanium tetraisopropoxide in ethanol. Then, this solution was diluted with 1 mol of 2-methyl-2,4-pentanediol, relative to 1 mol of the titanium alkoxide. The resultant solution was refluxed for 1 hr. After that, the heated solution was cooled down to room temperature, and then nitric acid was added thereto to make the solution acid. Then, to this solution there was added water in an amount equimolar with the titanium alkoxide. Then, this solution was refluxed at room temperature for 1 hr, thereby to obtain a titania sol (first sol).

To the obtained titania sol there was added a commercial silica sol (third sol), ATRON NSi-500 (trade name) of Nippon Soda Co., Ltd., in an amount such that the outermost layer contained 17 mol % of $SiO_2$ derived from the third sol, based on the total number of moles of $TiO_2$ and this $SiO_2$. Then, to this sol mixture there was added a commercial colloidal silica (second sol), ST-O (trade name) of Nissan Chemical Industries, Ltd., in an amount such that the outermost layer contained 20 wt %, based on the total weight of the outermost layer, of a silica which is derived from this colloidal silica and is in the form of fine particles. The resultant sol mixture was stirred for 1 hr.

Then, the obtained sol mixture was applied to the glass substrate by spin coating at a spinning rate of 1,000 rpm. The obtained coated film was air-dried and then baked at 500° C. for 30 min, thereby to form thereon an outermost layer having a thickness of about 100 nm.

Then, there was measured the initial contact angle of water drop disposed on the outermost layer. Then, this test sample (i.e., the glass substrate with the outermost layer formed thereon) was cut into halves. Then, one half of this was allowed to stand still in a darkroom for 14 hr. After that, this half was subjected to the measurement of the contact angle of water drop. The results of these measurements are shown in Table 1.

Then, there was determined the photodecomposition rate ($\eta$) of the outermost layer. The result is shown in Table 1. This photodecomposition rate is expressed by the following equation:

$\eta = [(\theta_1 - \theta_2)/(\theta_1 - 5°)] \times 100$, where $\theta_1$ is the contact angle of water drop disposed on the outermost layer which has been wiped by using ethanol and then air-dried, and $\theta_2$ is the contact angle of water drop disposed on that which has been irradiated, after the measurement of $\theta_1$, with ultraviolet rays having an intensity of 0.5 mW/cm$^2$ for 30 min, using an ultraviolet irradiation device. When $\theta_2$ was less than 5 degrees, $\theta$ was decided to be 100%.

In this example, $\theta_1$ and $\theta_2$ were actually 32 degrees and 7.2 degrees, respectively. A value of the photodecomposition rate which was higher than 50% was judged to be satisfactory, and that which was lower than 50% was judged to be unsatisfactory, with respect to the photodecomposition property of the outermost layer.

Furthermore, the outermost layer of the test sample was subjected to a traverse-type abrasion resistance test. In this test, a sliding member coated with canvas was moved on the outermost layer in a sliding manner until 5,000 reciprocations, by adding a load of 100 g to the sliding member. As shown in Table 1, the outermost layer did not exfoliate from the substrate by this test.

EXAMPLES 2–10

In these examples, Example 1 was slightly modified as follows. As shown in Table 1, there were selectively changed the molar percentages of TiO$_2$ and SiO$_2$, the amount of SiO$_2$ fine particles, and the baking temperature of the outermost layer. Furthermore, in each of these examples, a metal oxide interlayer was formed directly on a soda-lime glass substrate, prior to the formation of the outermost layer on the interlayer. This interlayer was prepared by applying a commercial silica sol, ATRON NSi-500, to the glass substrate, and then by heating the coated glass substrate at 400° C. The obtained interlayer made of silica had a thickness of 150 nm.

EXAMPLE 11

In this example, as shown in Table 1, Example 3 was repeated except in that the colloidal silica (SiO$_2$ fine particles) was replaced with a sol containing alumina fine particles dispersed therein. The solid matter of this sol was in an amount of 20 wt %, based on the total weight of the outermost layer.

COMPARATIVE EXAMPLE 1

At first, an interlayer was formed directly on a soda-lime glass substrate in the same manner as that of Examples 2–10. Then, an outermost layer was formed on the interlayer by applying to the interlayer a titania sol which is the same as that of Example 1 and then by baking the coated glass substrate at 500° C. for 30 min. The obtained outermost layer made of titania had a thickness of 100 nm. Then, the test sample was subjected to the same evaluation tests as those of Example 1. The results are shown in Table 1.

COMPARATIVE EXAMPLE 2

In this comparative example, Example 1 was repeated except in that the colloidal silica was omitted in the preparation of the outermost layer.

COMPARATIVE EXAMPLES 3–8

In these comparative examples, Example 2 was slightly modified as follows. As shown in Table 1, there were selectively changed the molar percentages of TiO$_2$ and SiO$_2$, the amount of SiO$_2$ fine particles, and the baking temperature of the outermost layer.

TABLE 1

| | TiO$_2$ (mol %) | SiO$_2$ (mol %) | Silica and/or Alumina Fine Particles Content | Baking Temp. (° C.) | Exfoliation of Outermost Layer in Abrasion Resistance Test | Initial Contact Angle (°) | Contact Angle after Standing Still in Darkroom for 14 hr (°) | Photo-decomposition Rate (%) |
|---|---|---|---|---|---|---|---|---|
| Example 1 | 83 | 17 | 20 wt % SiO$_2$ | 500 | No | 4.5 | 6.0 | 92 |
| Example 2 | 90 | 10 | 20 wt % SiO$_2$ | 500 | No | 5.0 | 7.0 | 88 |
| Example 3 | 83 | 17 | 20 wt % SiO$_2$ | 500 | No | 4.5 | 4.5 | 100 |
| Example 4 | 75 | 25 | 20 wt % SiO$_2$ | 500 | No | 7.0 | 14.0 | 62 |
| Example 5 | 83 | 17 | 10 wt % SiO$_2$ | 500 | No | 12.0 | 16.0 | 92 |
| Example 6 | 83 | 17 | 30 wt % SiO$_2$ | 500 | No | 5.5 | 6.0 | 70 |
| Example 7 | 83 | 17 | 50 wt % SiO$_2$ | 500 | No | 8.0 | 10.0 | 65 |
| Example 8 | 83 | 17 | 20 wt % SiO$_2$ | 500 | No | 10.0 | 18.5 | 90 |
| Example 9 | 83 | 17 | 20 wt % SiO$_2$ | 400 | No | 6.0 | 5.0 | 96 |
| Example 10 | 83 | 17 | 20 wt % SiO$_2$ | 600 | No | 6.0 | 5.5 | 97 |
| Example 11 | 83 | 17 | 20 wt % Al$_2$O$_3$ | 850 | No | 4.5 | 4.5 | 80 |
| Com. Ex. 1 | 100 | 0 | — | 500 | Yes | 4.5 | 25.0 | 100 |
| Com. Ex. 2 | 83 | 17 | — | 500 | No | 4.5 | 22.0 | 30 |
| Com. Ex. 3 | 95 | 5 | 20 wt % SiO$_2$ | 500 | Yes | 5.5 | 6.5 | 91 |
| Com. Ex. 4 | 70 | 30 | 20 wt % SiO$_2$ | 500 | No | 6.0 | 7.0 | 42 |
| Com. Ex. 5 | 83 | 17 | 5 wt % SiO$_2$ | 500 | No | 5.5 | 21.5 | 95 |
| Com. Ex. 6 | 83 | 17 | 70 wt % SiO$_2$ | 500 | Yes | 7.0 | 7.0 | 38 |
| Com. Ex. 7 | 83 | 17 | 20 wt % SiO$_2$ | 300 | Yes | 6.0 | 8.0 | 25 |
| Com. Ex. 8 | 83 | 17 | 20 wt % SiO$_2$ | 950 | No | 4.5 | 5.0 | 32 |

EXAMPLE 12

At first, a titania sol was prepared in the same manner as that of Example 1. Then, the titania sol was mixed with a non-spherical colloidal silica, ST-OUP (trade name) of Nissan Chemical Industries, Ltd., which was in an amount of 20 wt % on an oxide basis, based on the total weight of the outermost layer. This mixture was diluted with a solution containing 1 part by weight of water and 1 part by weight of ethanol, such that the diluted mixture (coating liquid) had a solid matter concentration of 3%. Then, this coating liquid was applied by spin coating at a spinning rate of 1,000 rpm to a clear float glass substrate, which had been washed and then dried in the same manner as that of Example 1. This glass substrate had the same dimensions as those of the glass substrate of Example 1. The coated glass substrate was air-dried and then baked at 500° C. for 30 min, thereby to obtain a transparent outermost layer having a thickness of 10 nm.

Then, the initial contact angle of water drop disposed on the outermost layer was measured. Then, the test sample was allowed to stand still in a darkroom for 24 hr. After that, the contact angle of that was measured, too. Separately, a thin film of dioctyl phthalate (DOP), which is used as a plasticizer, was formed on the test sample by depositing the heated DOP vapor thereon. This thin film is considered to be a monomolecular film. Then, the contact angle of water drop disposed on the DOP thin film was measured. Separately, there was measured the contact angle of water drop disposed on the outermost layer which had been irradiated for 1 hr with ultraviolet rays having an intensity of 0.5 mW/cm$^2$. The results are shown in Table 2.

The test sample was subjected to an abrasion resistance test. In this test, a cleanser (i.e., an abrasive powder for cleaning dishes and the like) was put on a cotton cloth. Then, this cotton cloth was rubbed against the surface of the outermost layer of the test sample until 10 reciprocative movements in a manner to traverse the test sample. Then, the outermost layer was washed with water. After that, the surface condition of the outermost layer was observed with the naked eyes. With this, scratches were found thereon, but their depth was shallow.

TABLE 2

| | Non-spherical Colloidal Silica (wt %) | Initial Contact Angle (°) | Contact Angle after 24 hr in Darkroom (°) | Contact Angle on DOP Film (°) | Contact Angle after UV Irradiation for 1 hr (°) |
|---|---|---|---|---|---|
| Com. Ex. 9 | 10 | 5 | 22 | 27 | 6 |
| Ex. 12 | 20 | 4.5 | 15 | 28 | 7 |
| Ex. 13 | 50 | 3.5 | 13 | 25 | 9 |
| Ex. 14 | 70 | 4 | 9 | 25 | 13 |
| Com. Ex. 10 | 80 | 4 | 7 | 26 | 28 |

EXAMPLES 13–14 and COMPARATIVE EXAMPLES 9–10

In these examples and comparative examples, Example 12 was repeated except in that the amounts of the non-spherical colloidal silica were respectively 50, 70, 10 and 80 wt %, as shown in Table 2.

In the abrasion resistance test of each of Examples 13–14, there were found slight scratches that became faintly shinny by the direct sunshine.

EXAMPLES 15–17 and COMPARATIVE EXAMPLES 11–12

In these examples and comparative examples, Example 13 was repeated except in that the baking temperatures were respectively 350, 700, 800, 200 and 900° C., as shown in Table 3.

TABLE 3

| | Baking Temperature (° C.) | Initial Contact Angle (°) | Contact Angle after 24 hr in Darkroom (°) | Contact Angle on DOP Film (°) | Contact Angle after UV Irradiation for 1 hr (°) |
|---|---|---|---|---|---|
| Com. Ex. 11 | 200 | 12 | 45 | 60 | 62 |
| Ex. 15 | 350 | 7 | 14 | 26 | 18 |
| Ex. 13 | 500 | 3.5 | 13 | 25 | 9 |
| Ex. 16 | 700 | 4 | 9 | 30 | 8 |
| Ex. 17 | 800 | 4.5 | 8.5 | 29 | 11 |
| Com. Ex. 12 | 900 | 3 | 8.5 | 29 | 35 |

EXAMPLES 18–20 and COMPARATIVE EXAMPLE 13

In these examples and comparative examples, a silica sol, ATRON N-Si500 (trade name) of Nippon Soda Co., Ltd., was applied by spin coating to glass substrates which are the same as that of Example 12. Then, the coated glass substrates were baked at 600° C. for 30 min, thereby to form on the glass substrates interlayers respectively having thicknesses of 50, 100, 200, and 400 nm, as shown in Table 4. Then, the outermost layers were respectively formed on the interlayers in the same manner as that of Example 13. The obtained test samples were subjected to the same evaluation tests as those of Example 12. The results are shown in Table 4. In Comparative Example 13, the glass substrate was set or curved after the baking of the coated glass substrate. Therefore, the evaluation tests were not conducted.

TABLE 4

| | Interlayer Thickness (nm) | Initial Contact Angle (°) | Contact Angle after 24 hr in Darkroom (°) | Contact Angle on DOP Film (°) | Contact Angle after UV Irradiation for 1 hr (°) |
|---|---|---|---|---|---|
| Ex. 18 | 50 | 5 | 12 | 25 | 6 |
| Ex. 19 | 100 | 4 | 10 | 28 | 4.5 |
| Ex. 20 | 200 | 4.5 | 14 | 28 | 4 |
| Com. Ex. 13 | 400 | — | — | — | — |

COMPARATIVE EXAMPLE 14

At first, a titania sol was prepared in the same manner as that of Example 1. Then, the titania sol was diluted with ethanol to obtain a coating solution having a solid matter concentration of 2 wt %. This coating solution was applied to a glass substrate which was the same as that of Example 12 by spin coating at a spinning rate of 1,000 rpm, followed by baking at 500° C. This application followed by baking was repeated once again. With this, there was obtained a transparent outermost layer having a thickness of 100 nm. The obtained test sample was subjected to the same evaluation tests as those of Example 12. In the abrasion resistance test, the outermost layer became weak, and whity scratches occurred thereon. The results of the other evaluation tests are shown in Table 5.

TABLE 5

|  | Outermost Layer Composition | Initial Contact Angle | Contact Angle after 24 hr in Darkroom (°) | Contact Angle on DOP Film (°) | Contact Angle after UV Irradiation for 1 hr (°) |
|---|---|---|---|---|---|
| Com. Ex. 14 | Titania | 5 | 23 | 35 | 7 |
| Com. Ex. 15 | Titania + SCS* (20 wt %) | 4 | 13 | 23 | 9 |
| Com. Ex. 16 | Titania + SCS* (50 wt %) | 3.5 | 9 | 19 | 7 |

*SCS: Spherical Colloidal Silica.

COMPARATIVE EXAMPLES 15–16

In each of these comparative examples, Example 12 was repeated except in that the non-spherical colloidal silica was replaced with a spherical colloidal silica, ST-O (trade name) of Nissan Chemical Industries, Ltd. In fact, in Comparative Examples 15–16, the amounts of the non-spherical colloidal silica were 20 wt % and 50 wt %, respectively. In the abrasion resistance test of each of Comparative Examples 15–16, there occurred scratches that were shallow, white in color, and wide in width.

What is claimed is:

1. A hydrophilic article comprising:
   a substrate; and
   a hydrophilic film formed on the substrate,
   wherein the film has a hydrophilic outermost layer, wherein the outermost layer has a matrix phase and a disperse phase distributed over the matrix phase, wherein the matrix phase comprises a combination of titania and an amorphous metal oxide and the disperse phase comprises at least one compound which is selected from the group consisting of silica and alumina and is in a form of particles, wherein the amorphous metal oxide has a particle diameter that is less than that of the at least one compound.

2. A hydrophilic film according to claim 1, wherein said amorphous metal oxide is in an amount of from 10 to 25 mol %, based on a total number of moles of said titania and said amorphous metal oxide.

3. A hydrophilic film according to claim 1, wherein said at least one compound is in an amount of from 10–50 wt %, based on a total weight of said hydrophilic outermost layer.

4. A hydrophilic film according to claim 1, wherein said substrate is made of a soda-lime glass.

5. A hydrophilic film according to claim 4, wherein said hydrophilic film further has an intermediate layer interposed between said substrate and said outermost layer, said intermediate layer being made of a metal oxide, such that there is prevented a migration of a sodium ion from said substrate to said outermost layer.

6. A hydrophilic film according to claim 5, wherein said metal oxide of said intermediate layer is one selected from the group consisting of silica, alumina and a double oxide of silica and alumina.

7. A hydrophilic film according to claim 1, wherein said titania is an anatase-type titania.

8. A hydrophilic film according to claim 1, wherein said amorphous metal oxide is at least one selected from the group consisting of silica, alumina, zirconia and mixtures of at least two of these.

9. A hydrophilic article according to claim 1, which is an automotive window glass pane.

10. A hydrophilic article according to claim 1, which is an automotive outside mirror.

11. A hydrophilic article comprising:
    a substrate; and
    a hydrophilic film formed on the substrate,
    wherein the film has a hydrophilic outermost layer, wherein the outermost layer has a matrix phase and a disperse phase distributed over the matrix phase, wherein the matrix phase comprises a combination of titania and an amorphous metal oxide and the disperse phase comprises at least one compound which is selected from the group consisting of silica and alumina and is in a form of particles, wherein the amorphous metal oxide has a particle diameter that is less than that of the said at least one compound, the outermost layer prepared by a method comprising the sequential steps of:
    (a) providing a sol mixture including a first sol containing a precursor of the titania, a second sol containing the at least one compound, and a third sol containing a precursor of the amorphous metal oxide;
    (b) coating the substrate with the sol mixture, thereby to form thereon a precursory film; and
    (c) baking the precursory film into the outermost layer.

12. A hydrophilic film according to claim 11, wherein said at least one compound is a colloidal silica which is in a non-spherical form.

13. A hydrophilic film according to claim 12, wherein said outermost layer contains 20–70 wt % of said colloidal silica.

14. A hydrophilic film according to claim 12, wherein said colloidal silica includes an elongate portion which has a diameter of from 5 to 50 nm and an axial length of from 40 to 500 nm.

15. A hydrophilic film according to claim 11, wherein said outermost layer has a thickness of from 20 to 500 nm.

16. A hydrophilic film according to claim 11, wherein said hydrophilic film has a metal oxide interlayer which is directly formed on said substrate, prior to the step (b), such that said metal oxide interlayer is interposed between said substrate and said outermost layer.

17. A hydrophilic film according to claim 11, wherein the step (c) is conducted at a temperature of from 300 to 850° C.

18. A hydrophilic film according to claim 11, wherein the step (c) is conducted at a temperature of from 400 to 850° C.

19. A hydrophilic article according to claim 11, wherein said at least one compound has a particle diameter of from 1 to 60 nm.

* * * * *